Oct. 14, 1969  B. M. GREEN  3,472,007
DOUBLE-DISC POWER CLIPPER
Filed Aug. 31, 1967  3 Sheets-Sheet 1

INVENTOR
BURTON M. GREEN

BY *Young & Thompson*

ATTORNEYS

Oct. 14, 1969  B. M. GREEN  3,472,007
DOUBLE-DISC POWER CLIPPER
Filed Aug. 31, 1967  3 Sheets-Sheet 2
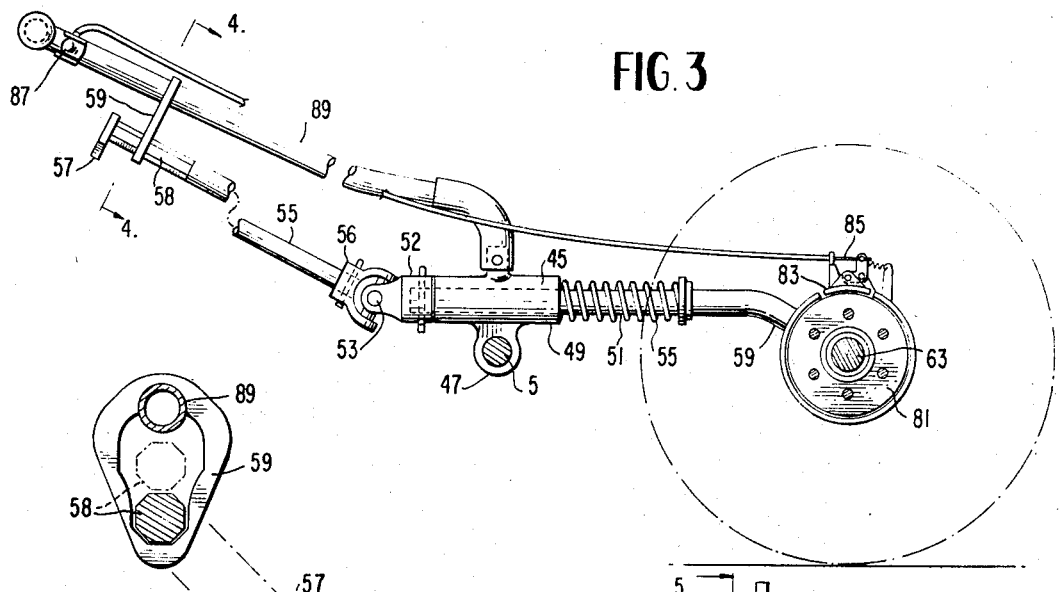
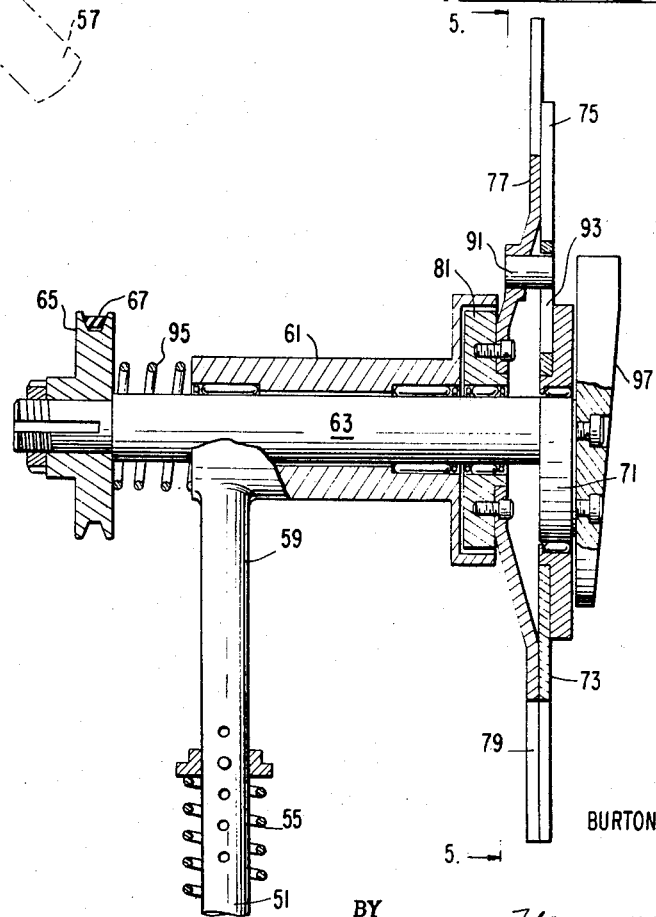
INVENTOR
BURTON M. GREEN
BY Young + Thompson
ATTORNEYS Oct. 14, 1969  B. M. GREEN  3,472,007
DOUBLE-DISC POWER CLIPPER
Filed Aug. 31, 1967  3 Sheets-Sheet 3

INVENTOR
BURTON M. GREEN
BY Young & Thompson
ATTORNEYS

United States Patent Office

3,472,007
Patented Oct. 14, 1969

3,472,007
DOUBLE-DISC POWER CLIPPER
Burton M. Green, 823 Riverside Drive,
Ormond Beach, Fla. 32074
Filed Aug. 31, 1967, Ser. No. 664,803
Int. Cl. A01d 53/14, 55/18
U.S. Cl. 56—25.4                10 Claims

ABSTRACT OF THE DISCLOSURE

A power clipper for vegetation comprises a pair of discs having outwardly extending teeth that are slidably juxtaposed. One disc is substantially larger than the other, and the smaller disc bodily follows a circular path under the influence of an eccentric. The discs are pin-and-slot connected, however, so that they have oscillation but do not have substantial rotation relative to each other. The larger disc may be selectively braked to be held stationary when out of contact with the ground, or permitted to roll in contact with the ground. The clipper is carried by a two-wheeled support, and the axis of the larger disc is in the same vertical plane as the common axis of the wheels.

---

The present invention relates to double-disc power clippers, of the type in which two discs have outwardly extending teeth and move relative to each other to perform a multiplicity of scissors-like cutting operations between the teeth of the discs. The clipper of the present invention is of the agricultural type, for clipping vegetation, and is particularly useful for trimming bushes and lawns and performing other such accurate tasks as cannot readily be performed by lawn mowers and the like.

The principal object of the present invention is the provision of a double-disc power clipper, in which neither of the discs rotates rapidly and the danger to the operator and damage to the soil and vegetation are at a minimum.

Another object of the present invention is the provision of a double-disc power clipper, which is equally well suited for use in contact with the ground or in positions raised above the level of the ground with the clipper assembly horizontal.

Still another object of the present invention is the provision of a double-disc power clipper which is readily maneuverable about sharp corners or in confined spaces.

Finally, it is an object of the present invention to provide a double-disc power clipper which will be relatively simple and inexpensive to manufacture, easy to operate, maintain and repair, and rugged and durable in use.

Other objects and advantages of the present invention will become apparent from a consideration of the following description, taken in connection with the accompanying drawings, in which:

FIGURE 2 is an enlarged fragment of the clipper assembly of FIG. 1, partially in cross section;

FIGURE 3 is a side elevational view, with parts omitted for clarity, of the device of FIG. 1;

FIGURE 4 is an enlarged section taken on the line 4—4 of FIG. 3;

Figure 1:
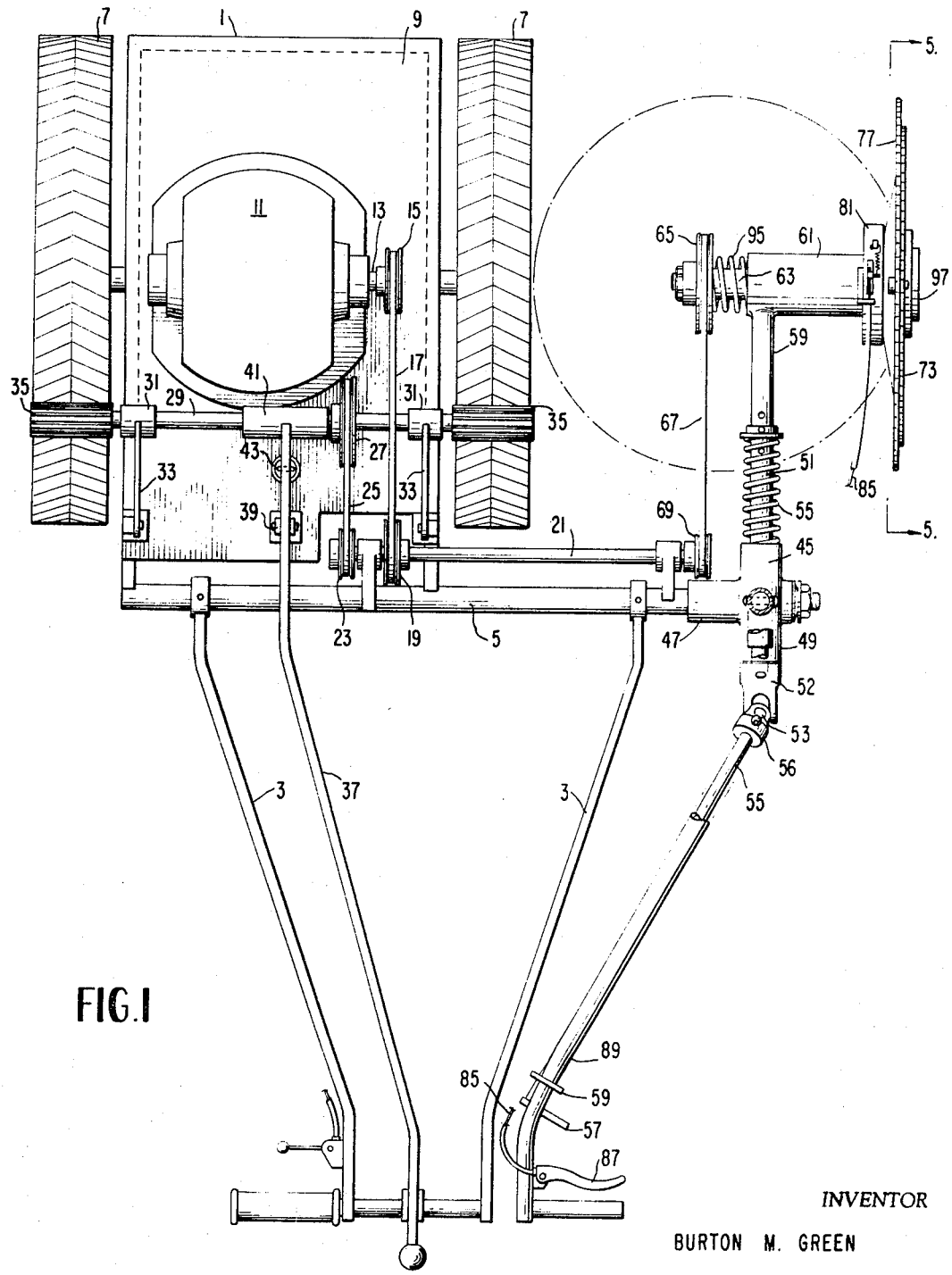
FIGURE 1 is a top plan view, with parts broken away, of a power clipper according to the present invention.

Referring now to the drawings in greater detail, and first to FIG. 1, there is shown a power clipper according to the present invention, comprising a chassis 1 which is guided and steered by means of a handle 3 rigidly connected to a drawbar 5 which in turn is fixed relative to the rest of chassis 1. The chassis and indeed the entire power clipper is supported tiltably on a pair of coaxial wheels 7 that support between them a horizontal plate 9. A motor 11 is mounted on plate 9 for propelling the chassis and operating the clipper, and may be of any desired type such as an electric motor or a gasoline engine. Motor 11 has a horizontal drive shaft 13 on which is fixed a drive pulley 15. A drive belt 17 interconnects pulley 15 with a pulley 19 fixed on a horizontal transmission shaft 21 which is mounted for rotation on drawbar 5 about an axis perpendicular to the line of movement of the chassis.

Transmission shaft 21 carries a drive pulley 23 which drives through a belt 25 to a pulley 27 fixed to a horizontal wheel drive shaft 29. Shaft 29 is rotatably carried in a pair of spaced bearings 31 which are supported at the upper ends of arms 33 which in turn are pivotally secured at their lower ends for vertical swinging movement on and relative to chassis 1. At its opposite ends, outwardly of bearings 31, shaft 29 carries drive rollers 35 which are in peripheral driving engagement with wheels 7.

A control lever 37 is mounted on a fulcrum 39 carried on the upper side of plate 9, and carries at its forward end a bearing 41 in which wheel drive shaft 29 rotates. A tension spring 43 acts between bearing 41 and plate 9 continuously to urge drive rollers 35 into peripheral driving contact with wheels 7. Downward pressure on lever 37, however, raises drive rollers 35 from contact with wheels 7, thereby to permit the chassis to be stopped. In other words, pressing down on lever 37 against the action of spring 43 interrupts the vehicle drive; while releasing lever 37 permits spring 43 to press rollers 35 against wheels 7 to ensure continuous vehicle drive.

Rotatably mounted on an outwardly extending portion of drawbar 5 is a crosshead bracket 45 comprising two sleeves 47 and 49 which are perpendicular to each other. As best seen by a comparison of FIGS. 1 and 3, sleeve 47 rotatably receives within it the drawbar 5; while sleeve 49 is superposed and receives within it a shaft or arm 51 which extends forwardly and rearwardly, but mostly forwardly, of sleeve 49.

Shaft 51 is screw-threaded at its rear end to receive a socket 52 that forms one-half of a universal joint 53. A coil compression spring 54 acts between the forward end of sleeve 49 and a portion of shaft 51 forwardly of sleeve 49, continuously to urge the shaft 51 forwardly, thereby continuously to maintain socket 52 in frictional engagement with the rear end of sleeve 49. An operating rod 55 is secured to the socket 56 that forms the other half of universal joint 53 and extends rearwardly and terminates in a handle 57 easily accessible to the operator. Rod 55 has a polygonal portion 58 that may be lowered into or raised from a complementary internal recess in the bottom of a fixed yoke 59. As will be seen by comparison of FIGS. 3 and 4, the rod 55 can be lifted until polygonal portion 58 clears its polygonal recess, to the phantom line position of FIG. 4, whereupon the handle 57 can be turned to the right or lift to rotate shaft 51 relative to sleeve 49 against the friction between sleeve 49 and socket 52, thereby to adjust the bodily vertically swung position of the clipper discs as will be explained later on.

At its forward end, shaft 51 is provided with a downwardly inclined forward portion 60 that terminates downwardly in a horizontal sleeve 61 parallel to the axis of wheels 7 and lying in the same vertical plane as the common axis of wheels 7. Sleeve 61 is extended a substantial distance laterally outwardly of forward portion 60 of shaft 51, so as to space the clipper discs a safe distance away from their support. Sleeve 61 internally carries a coaxial shaft 63 rotatable relative to sleeve 61 in roller bearings. At its innermost end, that is, its end toward the wheels 7, shaft 63 fixedly carries a pulley 65 over which is trained a belt 67 driven by a pulley 69 fixed to transmission shaft 21. In this way, shaft 63 is driven from shaft 21. The tension of belt 67 is maintained by spring 55.

At its end opposite pulley 65, shaft 63 carries an eccentric 71 that has a circular outer periphery. Eccentric 71, in turn, is rotatably received in a circular opening in a relatively small clipper disc 73 which has generally radially outwardly extending sharpened and tapered clipper teeth 75 that have cutting edges along both side edges thereof. Eccentric 71 is coaxial with disc 73. Therefore, disc 73 is never coaxial with shaft 63.

Coaxial with shaft 63, and rotatable relative thereto, is a relatively large clipper disc 77 having the same number of teeth 79 as disc 73 has teeth 75. However, as large disc 77 is substantially larger in diameter than small disc 73, the spacing between the tips of teeth 79 will be substantially different from the spacing between the tips of teeth 75. The angular distance will be the same, but the linear distance or peripheral distance will be different.

As can be best seen in FIG. 2, large disc 77 is secured to an annular brake drum 81 which is freely rotatable relative to shaft 63. Brake drum 81 is provided with a brake band 83 which may be selectively tightened and released by means of a wire 85 that can be pulled or released by a handle 87 carried on a lever 89 which is fixed to crosshead bracket 45. The purpose of lever 89 is to rock the crosshead bracket 45 about drawbar 5, thereby to adjust the elevation of the clipper disc assembly. Lever 89 also carries yoke 59 fixed thereto. The purpose of the brake provided by the parts 81–87 is selectively to fix large disc 77 against rotation, or to permit it to rotate freely when its teeth are in contact with the ground. In this latter case, when the clipper is advanced with its discs upright and the relatively large disc in contact with the ground, large disc 77 will turn in contact with the ground and will not score the ground as it passes. When the clipper disc assembly is raised out of contact with the ground, however, then the brake is applied to prevent disc 77 from moving at all, for a purpose which will next be explained.

Figure 5:
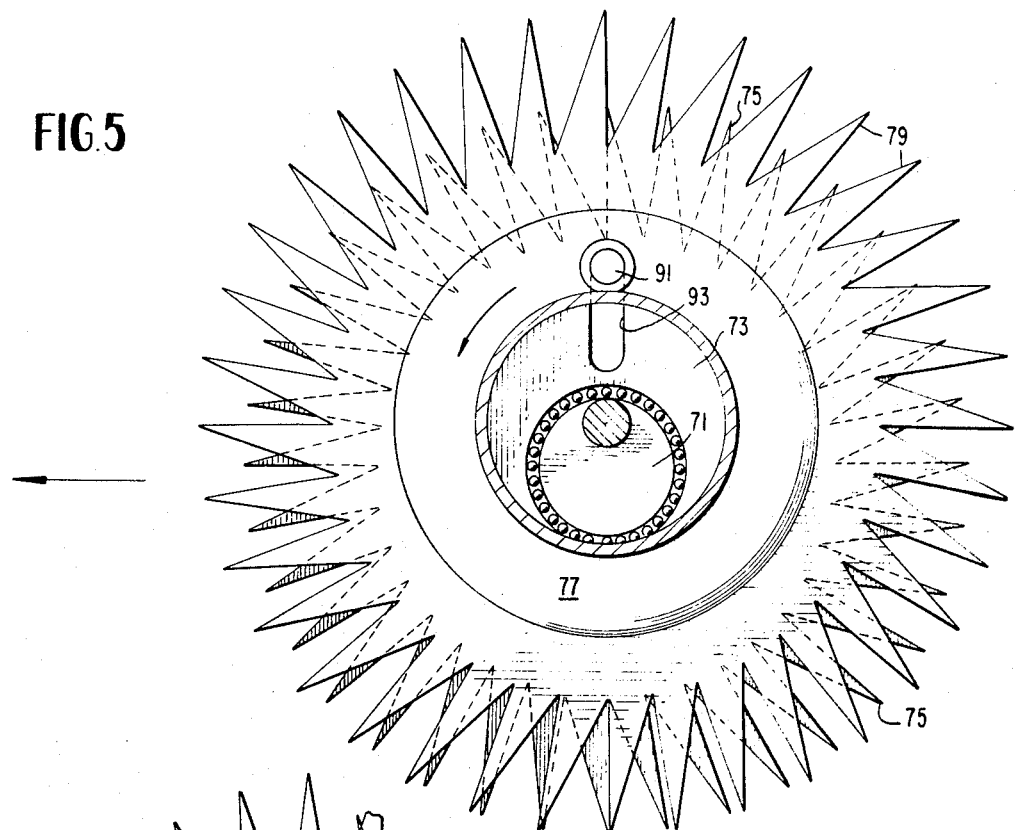
FIGURE 5 is a section taken on the line 5—5 of FIGS. 1 and 2.
Figure 6:
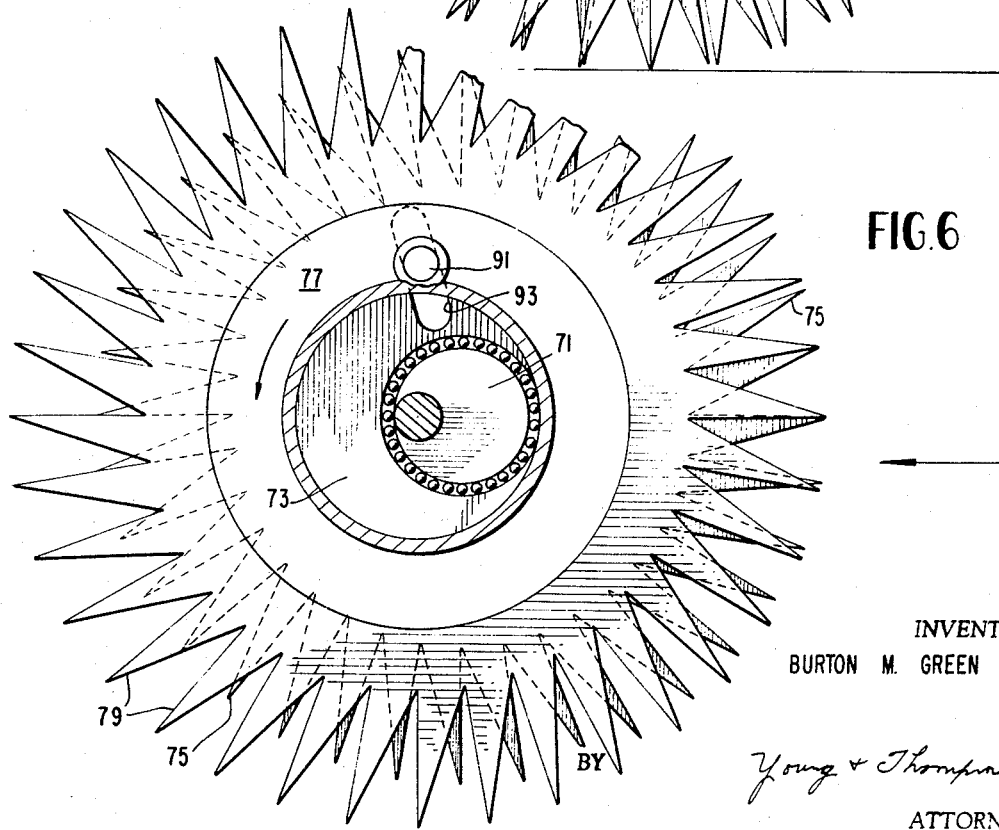
FIGURE 6 is a view similar to FIG. 5 but showing the parts in a somewhat different rotated position relative to each other, moving from right to left in a horizontal direction.

As can best be seen in FIGS. 5 and 6, discs 73 and 77 are interconnected by a pin-and-slot connection. A pin 91 is fixedly secured to large disc 77 and rides in a radially extending slot 93 in disc 73. By "radially extending," it is meant that slot 93 extends radially of disc 73, the fact being that slot 93 is disposed only intermittently radially of larger disc 77.

As can best be seen by a comparison of FIGS. 5 and 6, the teeth 75 and 79 of discs 73 and 77 have compound oscillatory movement relative to each other, but they do not rotate relative to each other. The common center of eccentric 71 and small disc 73 moves in a circle about the axis of shaft 63, and eccentric 71 rotates in and relative to disc 73. If larger disc 77 is assumed to be stationary, then it will be seen that smaller disc 73 in effect orbits within the periphery of disc 77. The center of circular eccentric 71 is displaced from the axis of shaft 63 a distance which is equal to the difference in radii of discs 73 and 77; as a result, the outer periphery of disc 73 meets the outer periphery of disc 77 on the inner side of that latter periphery, at a point which revolves about the axis of shaft 63 and disc 77 once with each rotation of eccentric 71. Each tooth 75 of small disc 73 thus swings relative to a most closely adjacent tooth 79 of disc 77, at the same time that it advances and recedes lengthwise of that tooth 79.

The teeth 79 of the large disc 77 must act as relatively stationary guard teeth; and the teeth 75 of small disc 73, which are in very rapid motion, never extend beyond the guarding periphery of the teeth 79. Thus, if the clipper discs should happen to run over the toe of the operator, no more damage will be done than would be done by an ordinary nonpowered harrow or cultivator. On the other hand, however, stalks and leaves of vegetation that penetrate between the teeth 79 of large disc 77 will be rapidly sheared by the scissors action between these teeth and the teeth 75. Moreover, as the nature of this scissors action continuously and rapidly changes about the periphery of the disc 77, by virtue of the planetary movement of the disc 73, there is minimum opportunity for the discs to become jammed in dense or heavy vegetation.

Should the discs nevertheless become jammed or clogged by vegetation lodging between them, they are automatically self-cleaning by virtue of the fact that shaft 63 and with it disc 73 is axially movable relative to sleeve 61 and its associated disc 77. A coil compression spring 95 encircles shaft 63 on the side of sleeve 61 remote from the cutter discs, and continuously yieldably acts between the adjacent end of sleeve 61 and pulley 65 to urge shaft 63 to the left as seen in FIG. 2. However, should vegetation tend to jam the two discs 73 and 77, then the discs can move apart automatically to unblock themselves, by movement of disc 73 and its associated shaft 63 to the right as seen in FIG. 2.

An axle cap 97 is secured to eccentric 71 and closes the joint between eccentric 71 and disc 73 and also holds the disc 73 in place. To counterbalance the off-center weight of eccentric 71, axle cap 97 is made somewhat thinner in the direction of throw or eccentricity of eccentric 71, and somewhat thicker in the opposite direction, so that axle cap 97 has a first moment of inertia equal and opposite to that of eccentric 71.

In operation, the actuation of the motor 11 simultaneously drives the wheels and the clipper. With the discs 73 and 77 upright, in the position shown in full line in FIG. 1, the device is useful for edging lawns and trimming low shrubs and similar operations. Because the shaft 63 lies in the same vertical plane as the common axis of wheels 7, the device can be easily maneuvered in small spaces and about sharp corners, so as to trim accurately and carefully.

The lever 89 may be vertically swung to rock the device and adjust the elevation of the clipper assembly. When the larger disc 77 is upright and in contact with the ground, as for a lawn-edging operation, then it is desirable that the teeth 79 "walk" on the ground, in other words, that the disc 77 rotate with a peripheral speed that is the same as the speed of advance of the vehicle. In this way, there is very little relative movement between an individual tooth 79 and the ground, with the result that the ground does not tend to become scored or gouged by the clipper. If the disc 77 were held stationary, on the other hand, then it would dig a small trench with its teeth 79. Therefore, in this position of the clipper assembly, the brake 81–87 is released so that disc 77 and brake drum 81 can turn freely relative to shaft 63. Shaft 63 will thus be rotating very rapidly within disc 77, while disc 77 will be turning relatively slowly.

On the other hand, when the clipper assembly is out of contact with the ground, then rapidly moving disc 73 has a tendency to drive disc 77, because slot 93 will tend to drive pin 91. To prevent this, in the raised position of the clipper assembly, the brake 81–87 is applied, so as to hold the disc 77 stationary relative to the chassis. The brake is also useful to keep disc 77 from rotating if the two discs become fouled.

In this raised position of the clipper assembly, it can be used not only for trimming and edging in a vertical plane, but also for clipping in a horizontal plane, thereby to regulate the height of grass or other vegetation in confined places which cannot be conveniently reached by a lawn mower. It is for this purpose that the shaft 51 may be rotated by lifting rod 55 and then turning rod 55 right or left to adjust the disc assembly from the vertical to horizontal. It is also for this purpose that the downwardly inclined forward portion 60 of shaft 51 is provided; for when shaft 51 is thus rotated, the pulley 65 tends to be swung clockwise, as seen by the operator, about the axis of shaft 51. This would ordinarily tend to increase the distance between the pulleys 65 and 69, beyond the capacity of belt 67 to accommodate this increase in distance. But with the gooseneck at the forward end of shaft 51, the sleeve 61 is shifted a distance to the left as seen in FIG. 1 upon this swinging movement of the disc assembly from the upright position of FIG. 1 to the broadside or horizontal position of FIG. 1 indicated by phantom lines, so that the distance between pulleys 65 and 69 remains essentially the same. The coil compression spring 54 will offest the increased tension on belt 67, and there is no need to interrupt the operation of the device.

It will therefore be seen that a powered clipper has been provided, whose cutter discs move in such a manner that there is little danger from them even when they directly contact the operator. The small relative movement between the cutter teeth also ensures that dirt and stones will not be thrown out, and that if the teeth should break they will not be thrown with great force. At the same time, there is minimum opportunity for the clipper discs to clog or jam. The clipper is also readily maneuverable in confined spaces and readily adjustable as to the height and inclination of the clipper assembly.

From a consideration of all the foregoing, therefore, it will be evident that all of the initially recited objects of the present invention has been achieved.

Although the present invention has been described and illustrated in connection with the preferred embodiment, it is to be understood that modifications and variations may be resorted to without departing from the spirit of the invention, as those skilled in this art will readily understand. For example, there can be two discs 77, on opposite sides of disc 73. Such modifications and variations are considered to be within the purview and scope of the present invention.

Having described my invention, I claim:

1. A power clipper comprising a pair of discs having outwardly extending clipper teeth thereon that slide against one another to clip vegetation, one of said discs being smaller than the other, means for moving the smaller disc so that its center moves in a closed path relative to the larger disc, and means restraining the discs against free rotation relative to each other.

2. A power clipper as claimed in claim 1, said closed path being a circle whose radius is substantially equal to the difference between the radius of the larger disc and the radius of the smaller disc.

3. A power clipper as claimed in claim 1, both discs having the same number of teeth.

4. A power clipper as claimed in claim 1, said means for moving the smaller disc comprising a drive shaft, power means for rotating the drive shaft about its axis, an eccentric carried by the drive shaft, means for counterbalancing said eccentric, and means mounting the smaller disc for rotation on and relative to said eccentric.

5. A power clipper as claimed in claim 1, said restraining means comprising a pin carried by one of said discs and riding in an elongated slot in the other of said discs.

6. A power clipper as claimed in claim 5, said slot extending radially of its disc.

7. A power clipper as claimed in claim 5, the pin being carried by the larger disc and the slot being disposed in the smaller disc.

8. A power clipper as claimed in claim 1, and brake means for the larger disc selectively engageable to restrain rotation of the larger disc when the larger disc is out of contact with the ground and releasable to permit rotation of the larger disc in contact with the ground.

9. A power clipper as claimed in claim 1, and a chassis on which the clipper is mounted, two coaxial wheels supporting the chassis for rolling on the ground, the axis of the larger disc lying substantially in the vertical plane that includes the axis of the wheels.

10. A power clipper comprising a pair of discs having outwardly extending clipper teeth thereon that slide against one another to clip vegetation, one of said discs being smaller than the other, a pin fixed to the larger disc and slidably disposed in a slot extending radially of the smaller disc, a drive shaft coaxial with the larger disc, an eccentric carried by the drive shaft and having a circular bearing surface thereon with which said smaller disc is rotatably connected, said eccentric having a throw which is equal to the difference in radii of said larger and smaller discs, so that upon rotation of the drive shaft, the center of the smaller disc rotates in a circle and the periphery of the smaller disc coincides with the periphery of the larger disc at a point that moves completely about the periphery of the larger disc once for each rotation of the drive shaft.

References Cited
UNITED STATES PATENTS

| | | | |
|---|---|---|---|
| 2,486,640 | 11/1949 | Garwood | 56—256 |
| 2,525,944 | 10/1950 | Ralston | 56—256 |
| 2,598,091 | 5/1952 | Ahlgrim | 56—25.4 |
| 2,645,010 | 7/1953 | Holmes | 56—25.4 |
| 2,691,264 | 10/1954 | Miller | 56—255 |

F. BARRY SHAY, Primary Examiner

J. W. MITCHELL, Assistant Examiner

U.S. Cl. X.R.

30—265; 56—256